United States Patent [19]
Gregornik et al.

[11] 3,852,245
[45] Dec. 3, 1974

[54] LOW TEMPERATURE EPOXY RESIN CURING AGENT COMPRISING BLEND OF AN ANHYDRIDE MIXTURE, AN ANHYDRIDE HALF ESTER, AND URANYL SALT

[75] Inventors: Norman W. Gregornik, Minneapolis; Frank D. Swanson, Hopkins, both of Minn.

[73] Assignee: Honeywell Inc., Minneapolis, Minn.

[22] Filed: June 14, 1973

[21] Appl. No.: 370,076

Related U.S. Application Data

[63] Continuation-in-part of Ser. No. 185,861, Oct. 10, 1971, abandoned.

[52] U.S. Cl.......... 260/59, 260/2 EC, 260/33.4 EP, 260/47 EC, 260/78.4 EP
[51] Int. Cl...................... C08g 30/06, C08g 30/12
[58] Field of Search......... 260/47 EA, 47 EC, 2 EA, 260/2 EC, 78.4 EP, 59, 33.4 EP

[56] References Cited
UNITED STATES PATENTS
3,328,318   6/1967   Proops et al..................... 260/2

OTHER PUBLICATIONS

Handbook of Epoxy Resins, Lee & Neville, 1967 (pp. 12–33; 12–34; 13–13)

Primary Examiner—Melvin Goldstein
Assistant Examiner—T. Pertilla
Attorney, Agent, or Firm—John S. Munday; Albin Medved; Charles J. Ungemach

[57] ABSTRACT

An epoxy resin composition which is useful for encapsulating materials which are sensitive to shock, extreme temperature or chemical attack in which an epoxy resin is cured by the use of a curing agent comprised of an anhydride which is partially reacted to the corresponding half ester by reaction with a polyol under catalysis with a uranyl salt. The anhydride, anhydride half ester uranyl salt mixture forms a storable curing agent capable of promoting the complete cure of epoxy resin compositions in short time periods at temperatures of 170°F or less.

1 Claim, No Drawings

LOW TEMPERATURE EPOXY RESIN CURING AGENT COMPRISING BLEND OF AN ANHYDRIDE MIXTURE, AN ANHYDRIDE HALF ESTER, AND URANYL SALT

This is a continuation-in-part of application Ser. No. 185,861 filed on Oct. 10, 1971, and now abandoned.

BACKGROUND OF THE INVENTION

Epoxy resins are used widely in a great number of industries for an endless number of purposes. These resins, when cured with the proper curing agent, are extremely strong, tough materials which are often times used to protect other more delicate materials. The resins in their cured state are admirably suited to withstand shock, extreme temperature and chemical attack.

One of the uses to which epoxy resins are often times put is as an encapsulating agent. Materials which must be protected from external forces are encapsulated in an epoxy resin so that they may perform their intended function without deleterious effects from the elements. Often times however, the material which is to be encapsulated is sensitive to the curing step in producing a cured epoxy resin. For example, integrated circuits are sensitive to chemical and temperature attack caused by curing epoxy resins with a curing agent which either causes a high exothermic curing temperature or is significantly reactive with the circuit. Similarly, explosives cannot be encapsulated because of the temperature or chemical effects of the curing step in producing an encapsulating epoxy resin.

If the problem is solely a desire to avoid extreme temperatures, such as those above 170°F, there are certain curing agents which are capable of causing the reaction of the epoxy resin to form a cured product. Among these curing agents are the amine type. Similarly, if chemical attack alone is the adverse effect which is to be avoided during cure, anhydride curing agents may be employed with the epoxy resin to encapsulate the various materials. However, at the present time neither amines nor anhydrides are capable of curing an epoxy resin while eliminating both excessive heat and chemical reactivity.

Ideally, either the amine type curing agents or the anhydride type curing agents could be modified to eliminate that difficulty which they present in the curing of epoxy resins in the presence of sensitive materials. Since a destruction or masking of the reactivity of the amine type curing agent would necessitate the loss or the significant reduction of its ability to act as a curing agent, it would be more practical to attempt to obviate the high temperature cure required for anhydride curing agents, since they are limited in their use only by the temperature at which an effective cure must be effected. It has been thought that lower temperatures would be practical for anhydride curing agents if the length of time necessary to effect a proper cure could be extended. This solution, however, becomes impractical when one finds that days or even weeks are necessary to effect a cure, rather than hours. Even then a cure is not generally achieved. The addition of a catalyst would be of great advantage in these systems if, without any side effects, one could cure an epoxy resin with an anhydride curing agent at a temperature less than 170°F.

Accordingly, it is an object of this invention to provide a catalyst which is suitable for curing epoxy resin — anhydride systems at temperatures less than 170°F.

It is a further object of this invention to provide a catalyst which permits such a cure within a reasonable period of time.

It is yet another object of this invention to provide a catalyst which will cure the above-mentioned epoxy resin — anhydride system to produce a material which is suitable to protect sensitive materials from shock, extreme temperature or chemical attack, while not adversely affecting the material during the curing step.

Other objects will appear hereinafter.

DESCRIPTION OF THE INVENTION

It has now been discovered that a composition may be provided which is useful with sensitive materials to protect them from shock, extreme temperature and chemical attack. Specifically, it has been discovered that epoxy resin compositions may be cured at temperatures of 170°F or less by the use of a curing agent comprised of an anhydride mixture which is partially reacted to the corresponding half ester by reaction with a polyol under catalysis with a uranyl salt. The reaction to form the half ester may be considered to proceed as follows

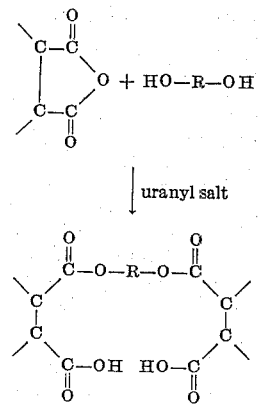

The curing agent then consists of a blend of the original anhydrides, the anhydride half ester and the uranyl salt used as a catalyst for the half ester reaction. When combined with an epoxy resin composition the reaction is essentially epoxy-anhydride accelerated by the half ester acid group and catalyzed by the uranyl salt. This combination allows complete reaction to occur within a short time period at temperatures of 170°F and less.

It has been further discovered that the curing agent formed in this manner is a fluid liquid at room temperature thus facilitating the incorporation of fillers and blending with epoxy resins and is capable of long term storage at normal temperatures allowing manufacture of shelf stable two component encapsulating compounds and adhesives.

Uranyl salts may, for the purposes of this invention, be defined as those compounds which contain a dioxouranium group which is dissociated as a cation when dispersed in a polyol. Among suitable compounds are the salts of inorganic or organic acids, such as uranyl chloride, bromide, nitrate, perchlorate, iodate, sulphate, arsenate, phosphate, formate, acetate, oxalate, salicylate and malate. In addition, uranyl chelates may be employed provided that the dioxouranium group is present upon dispersion in the polyol. Examples of these are uranyl octyl acetate and uranyl acetylacetonate. Of these, uranyl acetylacetonate is preferred.

Again, a wide variety of polyols may be used in the practice of the present invention, with the individual polyol being selected to give a half ester with specific reactivity viscosity and properties as hereinafter described. Example of polyols which may be used in the present invention are diethylene glycol, dipropylene glycol (either 1, 2 or 1, 3), trimethylene glycol, triethylene glycol, glycerol, hexane-2,4,6-triol, and pentane, 1,5-diol, and the like. Of these, most preferred is dipropylene glycol.

The amount of catalyst which is necessary to form the anhydride half ester and to effect the proper cure of the epoxy resin at temperatures under 170°F will vary depending upon the catalyst employed, namely the specific salt and polyol, but will generally be at least 0.05 percent by weight, based on the weight of the epoxy resin. In most instances, in order to cure the epoxy resin the catalyst will range in amount from at least 0.05 percent by weight to as much as 2.5 percent by weight or more, based on the weight of the epoxy resin. It has been found that an increase in the amount of catalyst will increase the rate of epoxy-anhydride cure reaction, but will simultaneously decrease slightly the ultimate strength of the cured resin. Therefore, the amount of catalyst should be selected to give the longest cure which is acceptable for the particular process concerned. Stated another way, as little catalyst as possible should be used so that the resin will cure in the longest period of time which is commercially acceptable for the specific use intended. Normally, this will include a catalyst range of from about 0.1 percent by weight to 1.0 percent by weight, based on the weight of the epoxy resin.

The amount of polyol which is used to form the anhydride half ester will depend upon the properties desired of the final composition. The inclusion of a significant excess of polyol will weaken the overall strength of the ultimate product since, the polyol forms a part of the structure. If the catalyst is added to the resin — anhydride mixture without any of the half ester present, unacceptably poor results are obtained because the uranyl salt is not capable of promoting the reaction without acceleration. The amount of polyol to be used to form the anhydride half ester must be carefully controlled to provide acceptable anhydride-epoxy reaction rate but to prevent deterioration of properties of the cured system. Additionally, as will be shown, the incorporation of excessive polyol and/or uranyl salt will result in instability in the cognizant composition which will lead to poor shelf life.

The epoxy resins which may be used in the present invention are well known commercially available epoxy resins which contain cyclic ether groups wherein an ether oxygen atom is attached to two adjacent carbon atoms thereby forming a cyclic structure. Many commercial epoxy resins are available and countless others are at least possible for manufacture. Broadly defined, there are at least five resin types which are commercially available at the present time, those types being: the diglycidyl ether of bisphenol A (and its homologs); glycidyl ethers of glycerol; glycidyl ethers of bisphenol F; glycidyl ethers of a long chain bisphenol; and epoxylated novolacs. Reference is hereby made to the text "Epoxy Resins Their Applications and Technology" by Henry Lee and Chris Neville, published by McGraw Hill Book Company, 1957 and later editions, in which various epoxy resins which may be employed in the present invention are described.

Of all of the many epoxy resins which are suitable for use in the present invention, two groups are generally preferred because of the strength and toughness of the resulting products. These are the novolac series of epoxy resins and the phenol-halohydrin reaction products. The latter series of resins are formed typically by reacting bisphenol A with epichlorohydrin in the presence of sodium hydroxide or the like. Other halohydrins may be empolyed such as 1,2-dichloro-3-hydroxypropane, and dichlorohydrin. Other phenols such as resorcinol, hydroquinone, pyrocatechol, and other mononuclear or polynuclear polyhydroxy phenols.

The novolac resins are broadly described as being polynuclear polyhydroxy phenols and may contain from 2 to 6 and as many as 12 phenolic hydroxyl groups per average molecule. These resins are prepared by condensing phenol with an aldehyde in the presence of an acid catalyst. Proportions of aldehyde and phenol may be varied. The aldehyde used normally is formaldehyde, although acetaldehyde, butyraldehyde and others are possible.

The curing agents which are employed with the epoxy resins of the present invention are generally referred to as anhydride curing agents. These anhydrides include methyl succinic anhydride, dodecenylsuccinic anhydride, tricarballylic anhydride, itaconic anhydride and other similar anhydrides. The cyclic anhydrides are preferred as curing agents of the present invention and include among others trimellitic anhydrides; 1,2,3-(6-methyl 1-4-cyclohexene) 3 tricarboxylic 1,2-anhydride; 1,2,4-butane tricarboxylic 1,2-anhydride; 1,2,3-pentane tricarboxylic 1,2-anhydride; 1,2,4-hexane tricarboxylic 1,2-anhydride; 1,2,5-(3-chloroheptane) tricarboxylic 1,2-anhydride; and the like. One particular anhydride curing agent which is particularly preferred for the present invention is the eutectic mixture of 30.8 percent by weight chloroendic anhydride, 23.1 percent by weight maleic anhydride and 46.1 percent by weight of methyl tetrahydrophalic anhydride.

In formulating the ultimate product for which the epoxy resin — anhydride system is intended, it is often desirable to employ a reactive diluent which functions generally to reduce the viscosity of the system so that it may be workable at ordinary room temperature. A reactive diluent is generally defined as being free flowing liquid used to reduce the viscosity of the resin. In one extreme, it is possible to use a low viscosity epoxy resin as a diluent while it is likewise possible to use propylene oxide. Normal diluents fall between these two extremes. A reactive diluent is merely a diluent which includes epoxy groups or other reactive groups. Zylene is a non-reactive diluent which often times employed in an epoxy resin system. Reactive diluents include styrene oxide, phenyl glycidyl ether, butyl glycidyl ether, and the like. In the present system, it is preferred that 2, 3, epoxy propanol be employed as a reactive diluent. Normally, the amount of reactive diluent will range from 5 percent to 30 percent by weight based on the weight of the epoxy resin being employed.

In addition, fillers may be employed which are added to the system to give bulk, strength, or other properties to the cured resin. These fillers may include among many others, aluminum powder, mica, bentonites, clays, synthetic resins and elastomers, aluminum oxide in the many forms it is available, asbestos fibers, wood flours, carbon black, silica, zinc dust, talc and the like. The particle size of the resin may range from less than 0.1 micron to as large as desired.

A combination of granular and finely divided silica is a preferred filler.

For a better understanding of the present invention, the following examples are presented by way of illustration, to demonstrate the efficacy of the present invention.

EXAMPLE I

In this example, the necessity of the polyol portion of the catalytic composition of the present invention is demonstrated. British Pat. No. 1,016,517 describes the use of uranyl salts as catalysts for epoxy resins. However, in this patent, the salts are added either in the pure state or as a solution in a solvent, the only example of which being trialkyl phosphate. Although the reference teaches that the salts may act as catalysts from a temperature as low as 140°F, all of the examples and illustrations are shown to be effected at temperatures of at least 240°F. Particularly, it was shown that uranyl acetylacetonate is capable of gelling a specific epoxy resin in 176 minutes at a temperature of 248°F. It was also shown that this same catalyst was capable of gelling the same resin at 284°F in 19 minutes. Of course, a mere gell does not indicate the final reaction and in no way demonstrates the strength of the product. A flexural strength of an extended cure at 284°F is shown as being 9.6 killograms per mm$^2$ which may be converted to being approximately 13,626 PSI this may be compared to further examples hereinafter described using the practices of the present invention wherein a flexural strength greater than 21,000 PSI is obtained at temperatures less than 170°F employing the practices of the invention.

EXAMPLE II

In this example and in those following, the present invention was employed to produce a cured epoxy resin system with high physical strength and toughness. The invention allowed the epoxy to be fully cured while restricting the combined cure and exothermic temperature peak to 170°F. This precluded damage to thermally sensitive material while avoiding the use of tertiary amines or other curing agents which may poison encapsulated materials such as integrated circuits.

Preparation of the anhydride curing agent consisted of mixing 22.4 parts by weight maleic anhydride, 44.7 parts by weight methyltetrahydrophthalic anhydride and 29.1 parts by weight of chlorendic anhydride. When thoroughly mixed at 200°F this blend results in a eutectic liquid at room temperature. After cooling, 1.14 parts by weight uranyl acetylacetonate and 1.89 parts by weight dipropylene glycol are added with agitation and slight heating to 150°F until the reaction is complete as indicated by complete dissolving of the uranyl acetylacetonate and change in color. Chemical analysis of the resulting product indicates that the half ester is formed by reaction between the dipropylene glycol and the maleic anhydride. Chemical analysis indicates that the uranyl acetylacetonate has formed a new, more stable complex within the anhydride-half ester mixture.

The amount of uranyl salt added to the anhydride curing agent should not exceed about 5% and preferably should be from 1 percent to 2½ percent by weight based upon the anhydride weight. The following data indicates the stability of the curing agent of this invention.

| Anhydride Mix./ | Viscosity after days at 160°F | | |
|---|---|---|---|
| Uranyl Acetylacetonate | 1 Day | 3 Days | 14 Days |
| 51.2/0.6 | 90 | 94 | 127 |
| 51.2/1.2 | 165 | 226 | 412 |
| 51.2/4.8 | 24,000 | 200,000 | Solid |

A novolac epoxy resin was reacted with the curing agent of this invention in a weight ratio of 85/49.4. After cure at less than 170°F the following results were measured.

| | Initial | After 10 Month Age |
|---|---|---|
| Flexural Strength | 21,230 PSI | 21,230 PSI |
| Compressive Strength | 35,940 | 33,200 |

The above results were obtained using 1.0 parts of dipropylene glycol and 0.6 parts of uranyl acetylacetonate, based upon 49.4 parts of the anhydride. Without first reacting the polyol with the anhydride, the resin would not cure to hardness at less than 170°F.

Having thus described the invention what is claimed is:

1. A composition which is useful with material sensitive to shock, extreme temperature or chemical attack comprising an epoxy novolac resin, which is cured with a curing agent at a temperature less than 170°F, and said curing agent comprising an eutectic mixture of 30.8 percent by weight chlorendic anhydride, 23.1 percent by weight maleic anhydride and 46.1 percent by weight methyl tetrahydrophthalic anhydride which is partially reacted to the corresponding half ester by reaction with dipropylene glycol and a catalyst comprising uranyl acetylacetonate dispersed in said glycol such that from 50 percent to 80 percent by weight is dissolved in said glycol.

* * * * *